United States Patent
Han et al.

(10) Patent No.: US 12,476,317 B2
(45) Date of Patent: Nov. 18, 2025

(54) BATTERY HOLDER COVER PLATE AND CAMERA

(71) Applicant: Dongguan HDKing Smart Technology Co., LTD., Guangdong (CN)

(72) Inventors: Bolin Han, Guangdong (CN); Yongchun Ren, Guangdong (CN)

(73) Assignee: Dongguan HDKing Smart Technology Co., LTD., Dongguan (CN)

( * ) Notice: Subject to any disclaimer, the term of this patent is extended or adjusted under 35 U.S.C. 154(b) by 175 days.

(21) Appl. No.: 18/465,584

(22) Filed: Sep. 12, 2023

(65) Prior Publication Data

US 2025/0070359 A1    Feb. 27, 2025

(30) Foreign Application Priority Data

Aug. 25, 2023   (CN) .......................... 202322305881.5

(51) Int. Cl.
*H01M 50/262* (2021.01)
*G03B 17/02* (2021.01)
*H01M 50/247* (2021.01)
*H01M 50/271* (2021.01)

(52) U.S. Cl.
CPC .......... *H01M 50/247* (2021.01); *G03B 17/02* (2013.01); *H01M 50/262* (2021.01); *H01M 50/271* (2021.01); *H01M 2220/30* (2013.01)

(58) Field of Classification Search
CPC .................................................. H01M 50/262
See application file for complete search history.

(56) References Cited

U.S. PATENT DOCUMENTS 8,241,783 B2 *   8/2012  Tsuji ................... H01M 50/271
                                                      429/97
2022/0299846 A1 *   9/2022  Crow ..................... G03B 17/08

FOREIGN PATENT DOCUMENTS

CN       113228835 A  *  8/2021   ............ G03B 17/02
JP       2012215667 A  *  11/2012

* cited by examiner

*Primary Examiner* — Leon W Rhodes, Jr.

(57) ABSTRACT

The present disclosure provides a battery holder cover plate and a camera. The battery holder cover plate includes a first sliding cover, a second sliding cover, an open/close button, an elastic sheet and an inner cover plate. The first sliding cover and the second sliding cover are slidably connected. One end of the elastic sheet is connected to the first sliding cover, and the other end is connected to the open/close button. The open/close button is arranged in a button through hole of the first sliding cover. The clamping convex block is arranged at one end of the arc of the first sliding cover. One end of the second sliding cover is provided with an open connecting hole. Compared with the prior art, the present disclosure can be more labor-saving and portable during opening of the battery holder cover plate. The battery holder cover plate is removable, waterproof and dustproof.

12 Claims, 9 Drawing Sheets

BATTERY HOLDER COVER PLATE AND CAMERA

CROSS-REFERENCE TO RELATED APPLICATIONS

The application claims priority of Chinese patent application CN2023223058815, filed on 2023 Aug. 25, which is incorporated herein by reference in its entireties.

TECHNICAL FIELD

The present disclosure relates to the technical field of photographic equipment, and in particular, to a battery holder cover plate and a camera.

BACKGROUND

With the development of social economy and the improvement of the living standard, there is an increasing demand for photographing. As the performance of the camera continues to improve, the power consumption is increasing, and the consumption of battery power is also increasing. Most cameras use detachable batteries. However, in the prior art, slideways are arranged on two sides of a battery holder in most cases. A battery cover is of a buckle structure that is hardly pressed and pushed open. In practical use, it may be difficult to open the battery cover, or the battery cover may accidentally fall off or be lost after being removed, and the battery cover is not waterproof. A buckle of the battery cover may be easily damaged.

SUMMARY

In order to overcome the shortcomings of the prior art, the present disclosure provides a battery holder cover plate and a camera.

The technical solution adopted by the present disclosure to solve the technical problem is as follows:

In a first aspect, the present disclosure discloses a battery holder cover plate, applied to a camera and configured to be covered at a battery holder of the camera, wherein the battery holder cover plate includes a first sliding cover, a second sliding cover, an open/close button, an elastic sheet, and an inner cover plate; a clamping convex block is arranged at one end of the first sliding cover; the clamping convex block is configured to be clamped to a clamping slot in one end of the camera; one end of the second sliding cover is configured to be rotatably connected to the other end of the camera; the first sliding cover and the second sliding cover are slidably connected; one end of the elastic sheet is connected to the first sliding cover, and the other end is connected to the open/close button; the open/close button is arranged in a button through hole of the first sliding cover; the open/close button slides between a released position and a locked position; when the open/close button slides to the locked position, the elastic sheet abuts against the first sliding cover to limit relative sliding between the first sliding cover and the second sliding cover; the clamping convex block is clamped to the clamping slot to prevent the battery holder cover plate from rotating; when the open/close button slides to the released position, the elastic sheet is separated from the first sliding cover to allow the first sliding cover and the second sliding cover to slide relatively; the clamping convex block is separated from the clamping slot to allow the battery holder cover plate to rotate; and the inner cover plate is connected to the second sliding cover, and a size of the inner cover plate matches a size of a battery holder opening of the camera.

Further, a first groove is formed in an inner side wall of the first sliding cover; first sliding blocks are arranged on two opposite sides of the first groove; a slideway is formed between the first sliding block and the first groove; a first part of the second sliding cover is arranged in the first groove, and second sliding blocks are convexly arranged on two sides of the first part of the second sliding cover; and the second sliding block is embedded in the slideway and slides in the slideway.

Further, one end of the first groove is adjacently provided with a first convex block and a second convex block; the button through hole is arranged at one end away from the first convex block and the second convex block; one end of the elastic sheet is provided with a fourth through hole and a fifth through hole; the first convex block is connected to the fourth through hole; and the fifth through hole sleeves the second convex block.

Further, a second groove is formed in the open/close button; a fourth convex block is arranged in the second groove; the other end of the elastic sheet is provided with a third through hole and is embedded in the second groove; and the third through hole sleeves the fourth convex block.

Further, first limiting slots are arranged on two sides of the first part of the second sliding cover; a sixth convex block is arranged at one end, close to the third through hole, of the elastic sheet; and the sixth convex block is clamped in the first limiting slots to limit the relative sliding between the first sliding cover and the second sliding cover.

Further, the first part of the second sliding cover is further provided with a first through hole and a second through hole, and the open/close button is slidably arranged in the first through hole; and the elastic sheet passes through the second through hole and is connected to the first sliding cover.

Further, third convex blocks are arranged on the first part of the second sliding cover in an opposite manner; the elastic sheet is arranged between the third convex blocks; a limiting bulge is arranged between the fourth through hole of the elastic sheet and the third through hole; the open/close button is provided with a third limiting slot; the first part of the second sliding cover is provided with a second limiting slot; and the limiting bulge is slidably arranged in the second limiting slot and abuts against the third limiting slot.

Further, an edge of the open/close button is provided with a ringlike bulge in a surrounding manner; and the ringlike bulge abuts against the first sliding cover.

Further, a second part of the second sliding cover is cambered and is provided with a connecting hole; an opening is arranged at the connecting hole; the clamping convex block is arranged at one end of the arc of the first sliding cover; and a convex bar is arranged on an outer side wall between the clamping convex block and the button through hole.

In a second aspect, the present disclosure also discloses a camera, including a camera body and the battery holder cover plate as described in the first aspect. The camera body is provided with a battery holder; a battery is fixed in the battery holder through the battery holder cover plate; the camera body is provided with a battery holder opening; a rotating shaft and the clamping slot are arranged at two ends of the battery holder opening; the second sliding cover is provided with a connecting hole; and the connecting hole is connected to the rotating shaft to achieve rotatable connection between the battery holder cover plate and the camera body, and to cover the battery holder opening.

BRIEF DESCRIPTION OF THE DRAWINGS

In order to explain the technical solutions of the embodiments of the present disclosure more clearly, the following will briefly introduce the accompanying drawings used in the embodiments. Apparently, the drawings in the following description are only some embodiments of the present disclosure. Those of ordinary skill in the art can obtain other drawings based on these drawings without creative work.

The present disclosure is further described below in detail in combination with the accompanying drawings and embodiments.

DETAILED DESCRIPTION OF THE EMBODIMENTS

Figure 1:
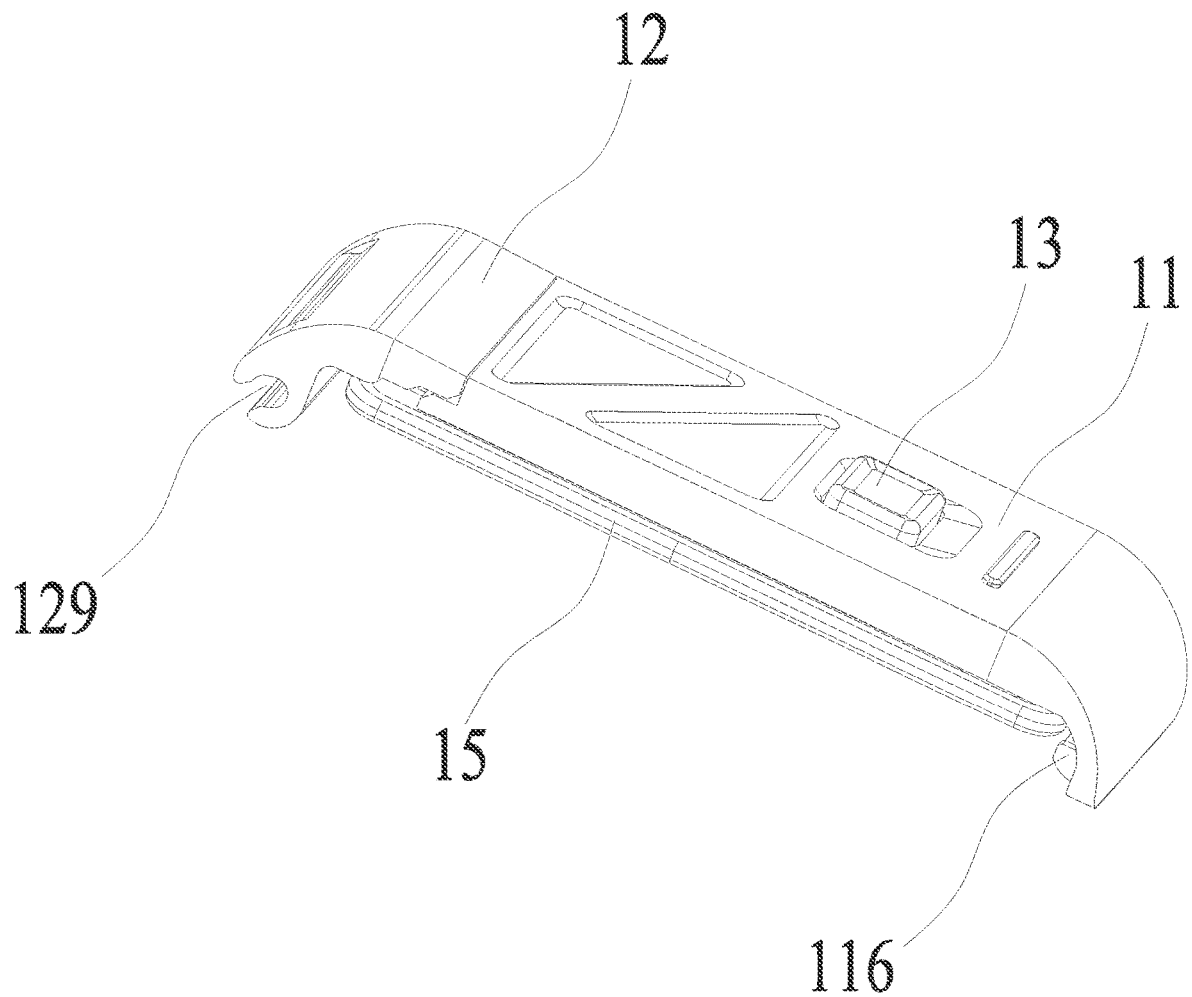
FIG. 1 is a schematic diagram of an overall structure of a battery holder cover plate of the present disclosure.
Figure 2:
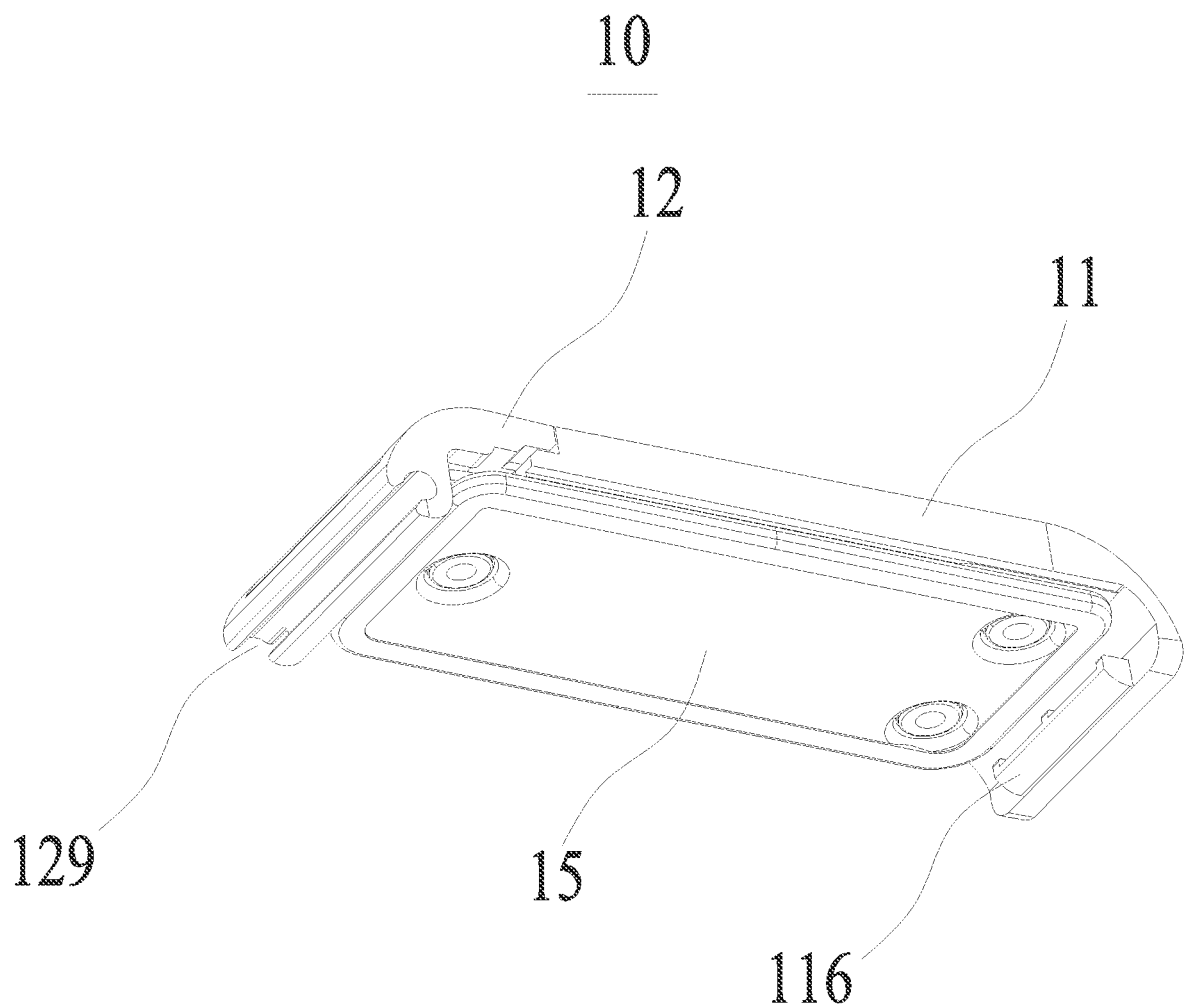
FIG. 2 is a schematic diagram of an overall structure of a battery holder cover plate of the present disclosure in another angle.
Figure 3:
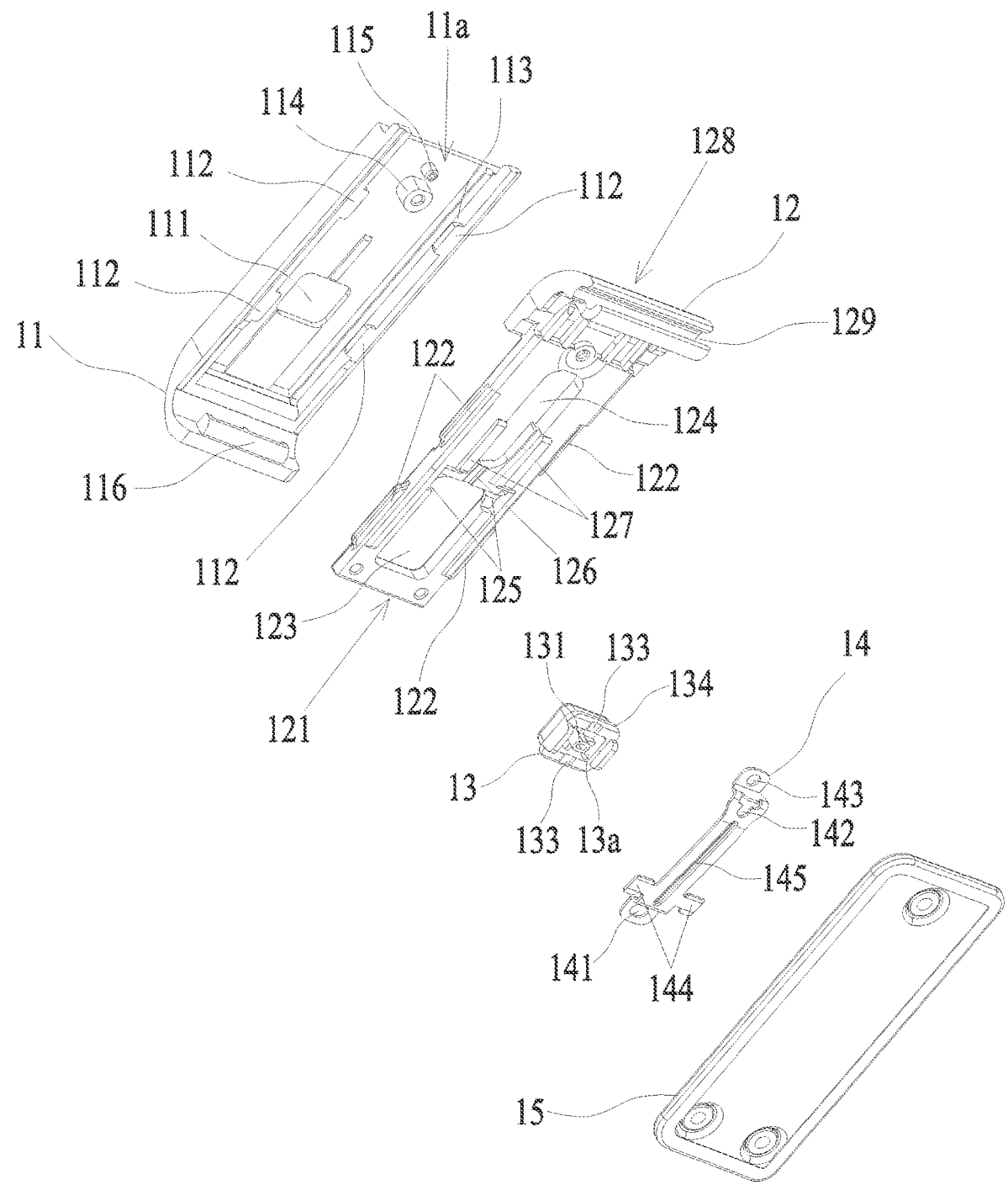
FIG. 3 is a three-dimensional exploded diagram of a battery holder cover plate of the present disclosure.
Figure 4:
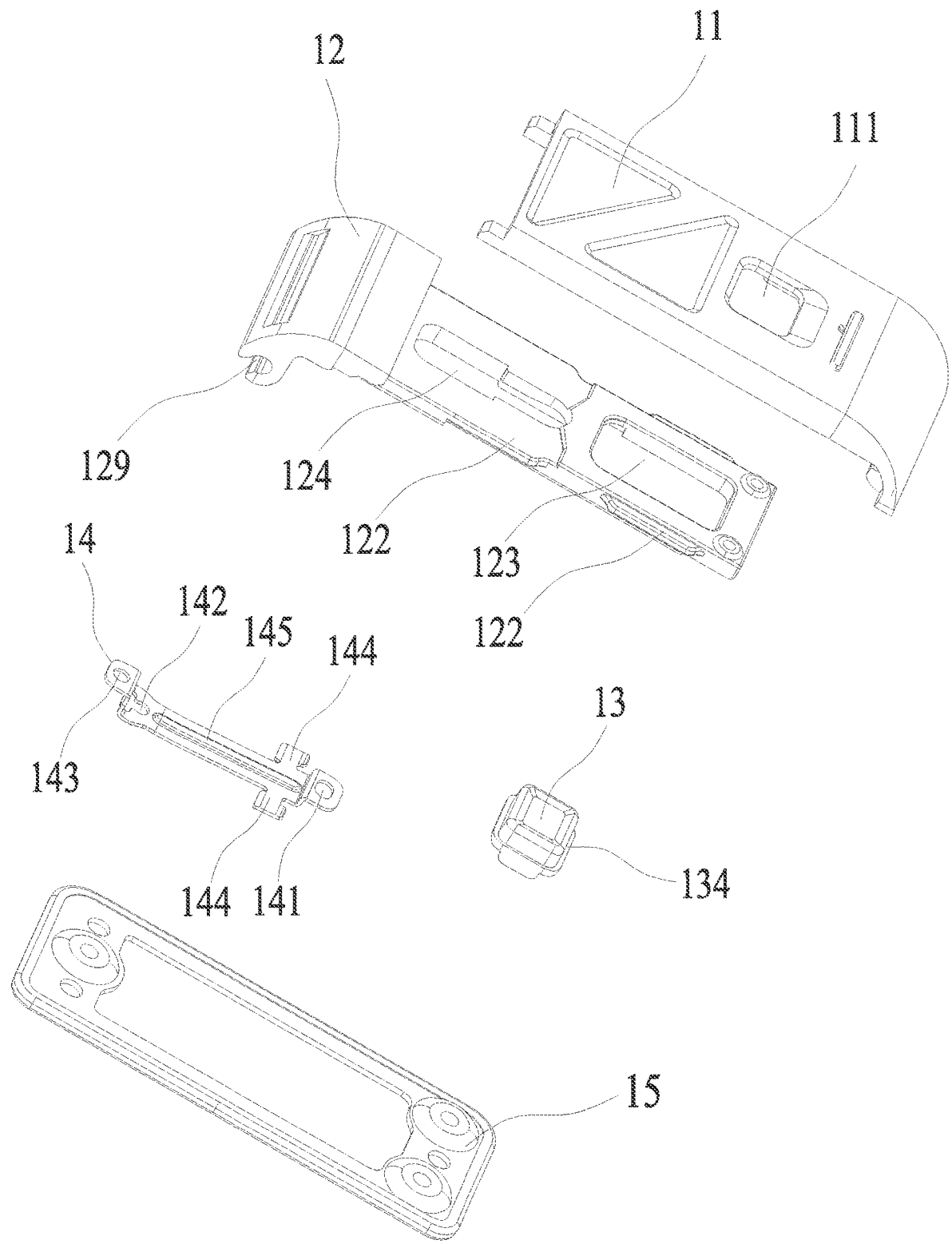
FIG. 4 is a three-dimensional exploded diagram of a battery holder cover plate of the present disclosure in another angle.
Figure 5:
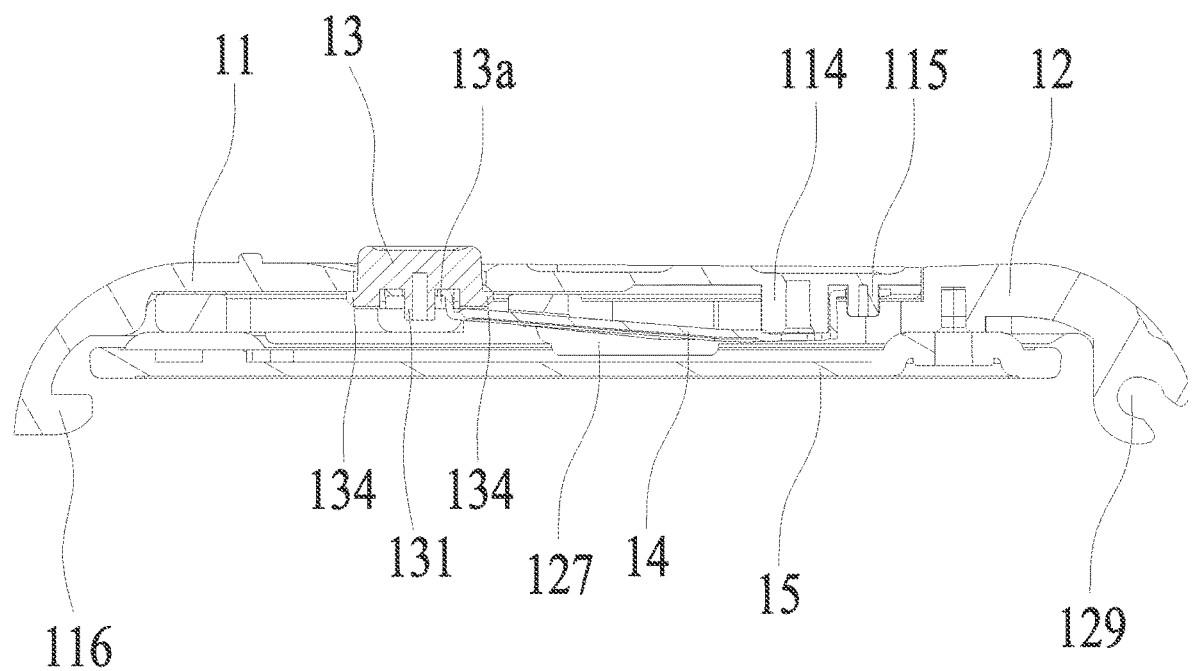
FIG. 5 is a sectional diagram of a battery holder cover plate of the present disclosure.
Figure 6:
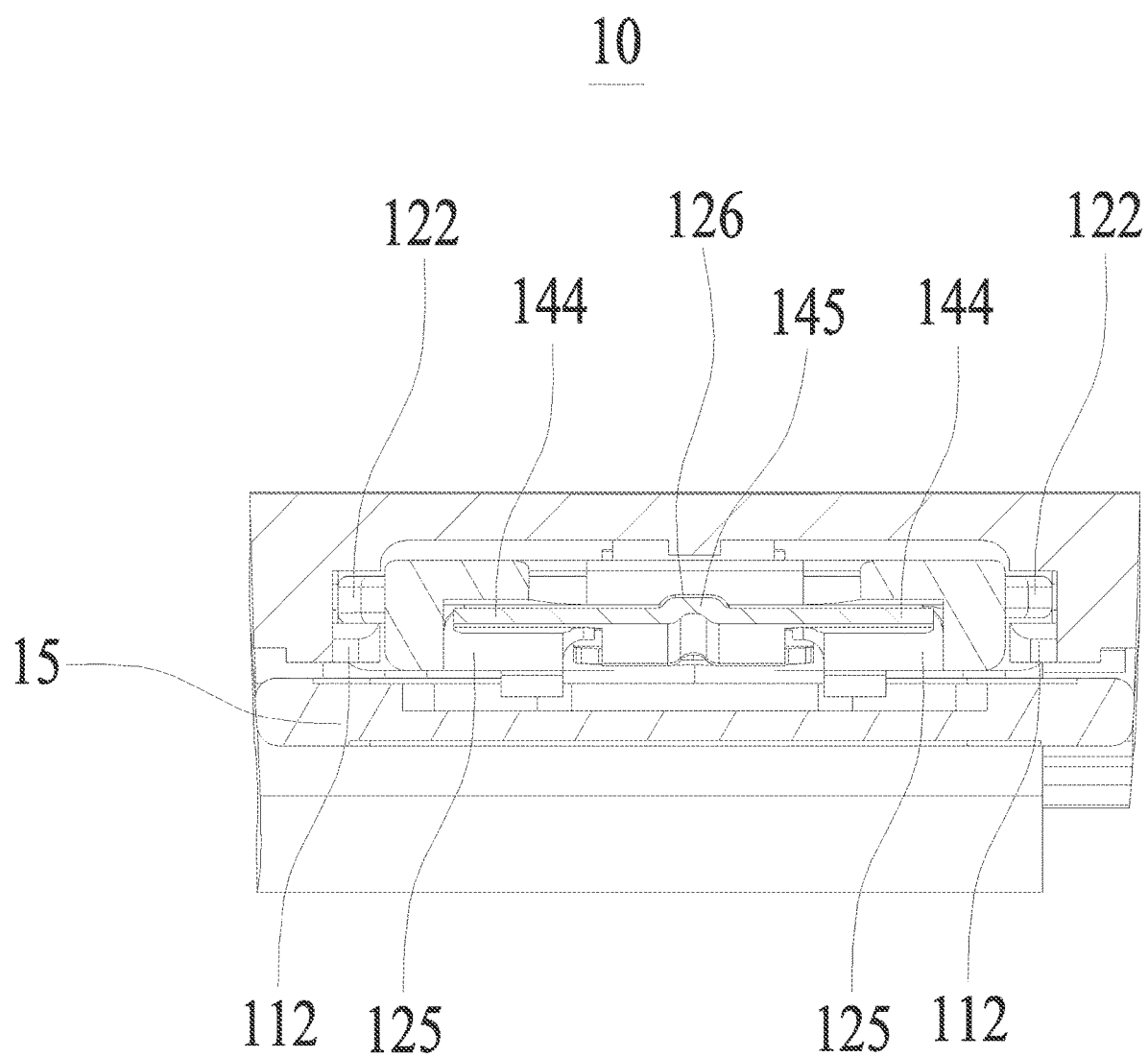
FIG. 6 is a sectional diagram of a battery holder cover plate of the present disclosure in another angle.
Figure 7:
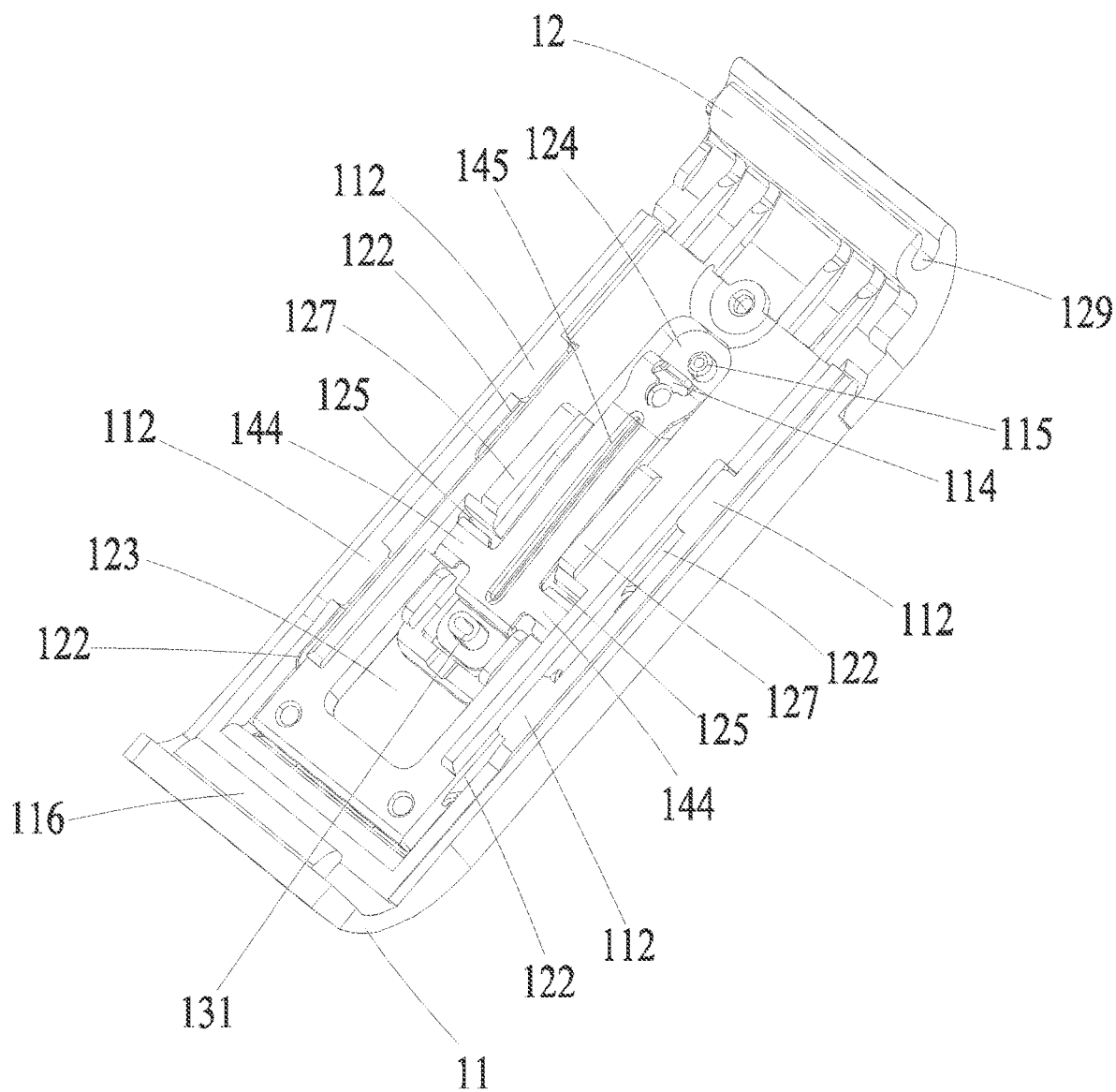
FIG. 7 is a schematic diagram of a three-dimensional structure of removing an inner cover plate from a battery holder cover plate of the present disclosure.
Figure 8:
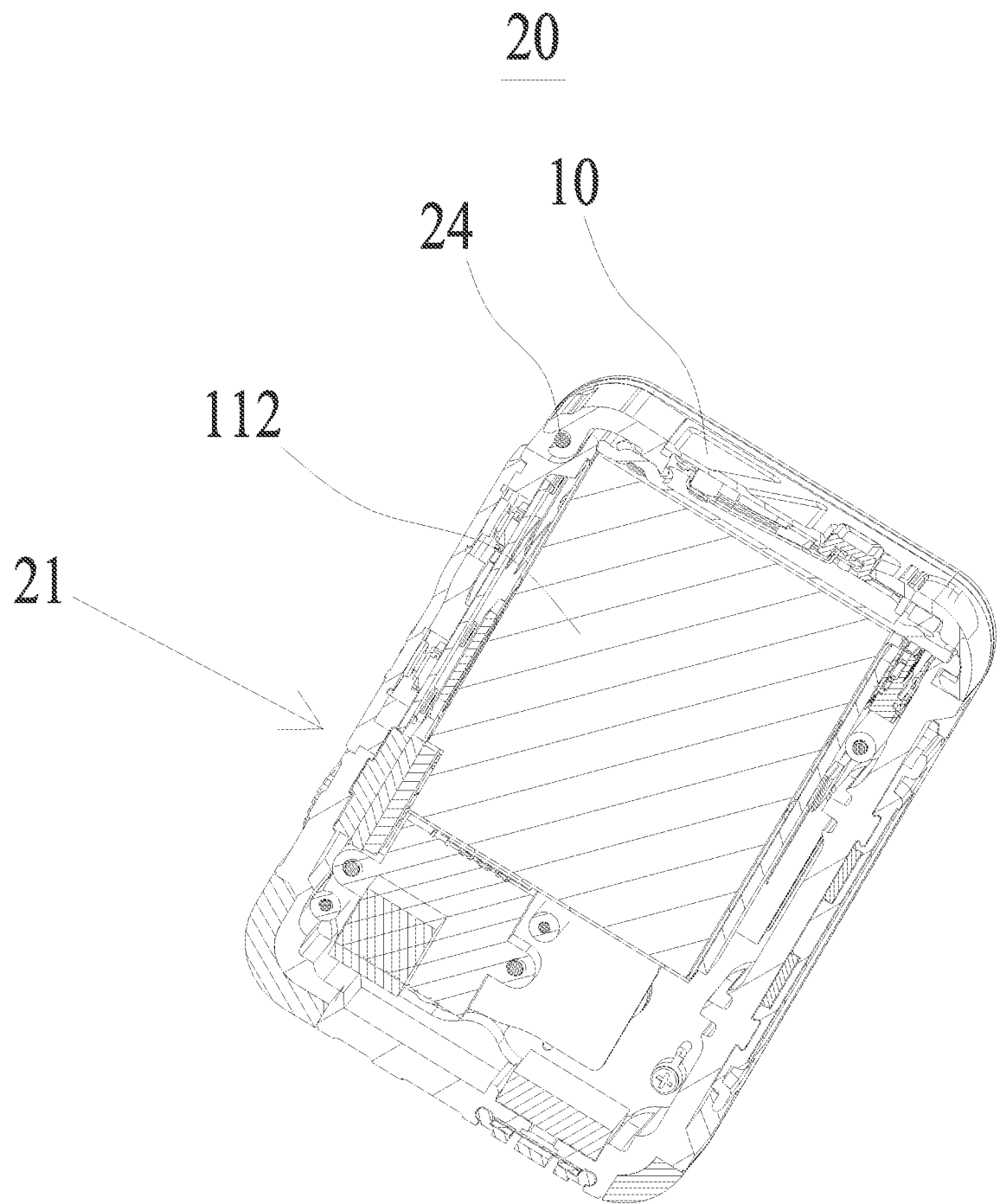
FIG. 8 is a sectional diagram of a camera of the present disclosure.
Figure 9:
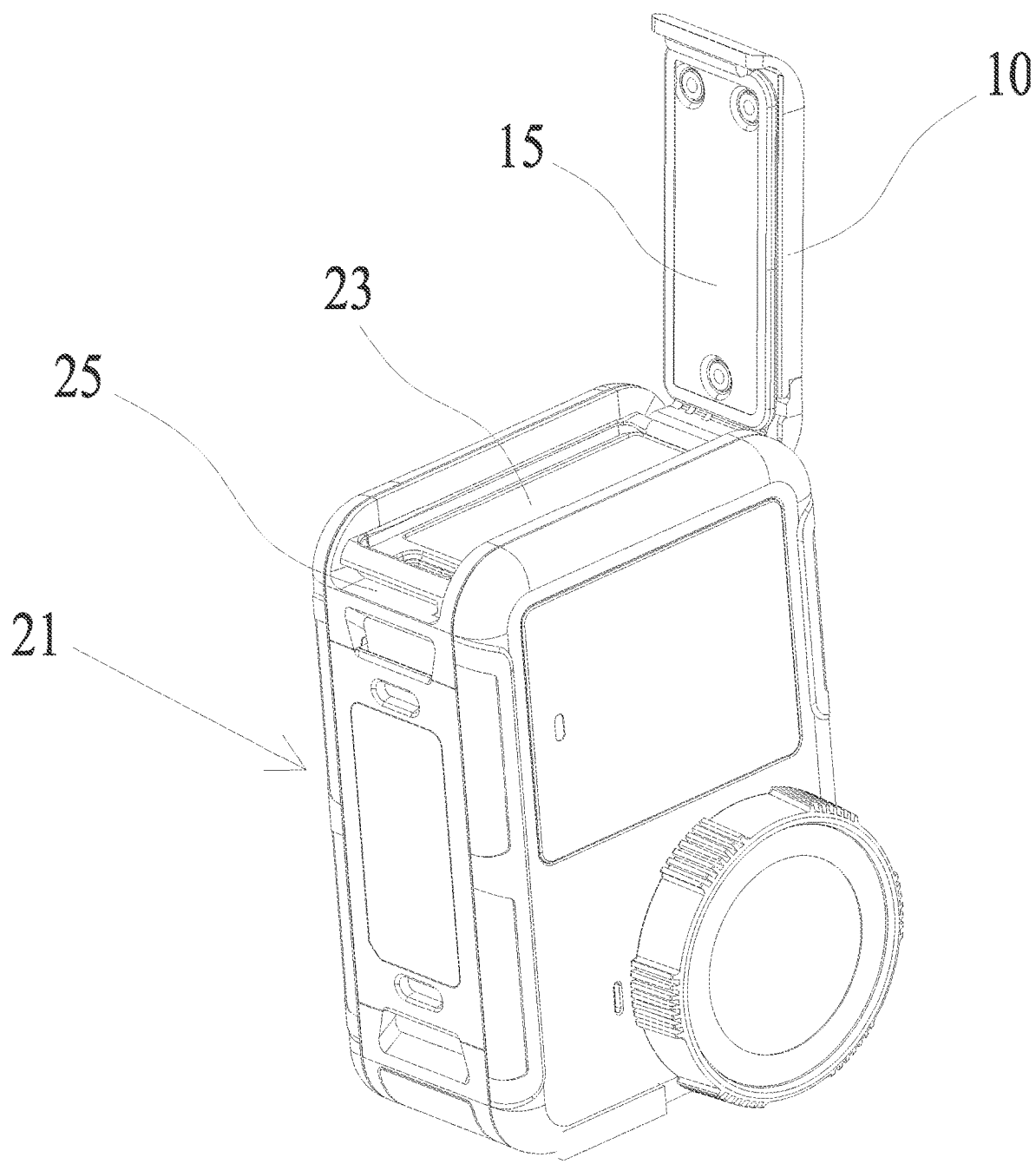
FIG. 9 is a schematic diagram of a three-dimensional structure of an unfolded battery holder cover plate of a camera of the present disclosure.

Referring to FIG. 1 to FIG. 7, on the one hand, the present disclosure provides a battery holder cover plate 10, applied to a camera 20 and configured to be covered at a battery holder 23 of the camera 20. The battery holder cover plate includes: a first sliding cover 11, a second sliding cover 12, an open/close button 13, an elastic sheet 14, and an inner cover plate 15.

A clamping convex block 116 is arranged at one end of the first sliding cover 11. The clamping convex block 116 is configured to be clamped to a clamping slot 25 in one end of the camera 20.

One end of the second sliding cover 12 is configured to be rotatably connected to the other end of the camera 20.

The first sliding cover 11 and the second sliding cover 12 are slidably connected. One end of the elastic sheet 14 is connected to the first sliding cover 11, and the other end is connected to the open/close button 13. The open/close button 13 is arranged in a button through hole 111 of the first sliding cover 11.

The open/close button 13 slides between a released position and a locked position. When the open/close button 13 slides to the locked position, the elastic sheet 14 abuts against the first sliding cover 11 to limit relative sliding between the first sliding cover 11 and the second sliding cover 12. The clamping convex block 116 is clamped to the clamping slot 25 to prevent the battery holder cover plate 10 from rotating. When the open/close button 13 slides to the released position, the elastic sheet 14 is separated from the first sliding cover 11 to allow the first sliding cover 11 and the second sliding cover 12 to slide relatively. The clamping convex block 116 is separated from the clamping slot 25 to allow the battery holder cover plate 10 to rotate.

The inner cover plate 15 is connected to the second sliding cover 12, and a size of the inner cover plate 15 matches a size of a battery holder opening of the camera 20.

It can be understood that a user only needs to press the open/close button 13 to cause the open/close button 13 to reach the released position, and then slides the first sliding cover 11 to separate the clamping convex block 116 from the clamping slot 25 of the camera 20, thereby opening the battery holder cover plate 10. When the battery holder cover plate 10 is covered at the camera 20, the user only needs to release the hand, and the open/close button 13 will bounce back to the locked position. The clamping convex block 116 is clamped to the clamping slot 25, and the battery holder cover plate 10 is then locked with the camera 20. Compared with the prior art, the battery holder cover plate 10 is more labor-saving and convenient to use. The battery holder cover plate 10 is of a multilayer structure, which is firmer and more durable, and has a longer service life.

The inner cover plate 15 is made of a silicone material, which is connected to the second sliding cover 12 through a locking member. A size of the inner cover plate matches the size of the battery holder opening of the camera 20, which can make the camera 20 waterproof and used in various occasions, such as rainy days, water spots or underwater photography, and a battery 22 can be better protected. The inner cover plate 15 can also play a limiting role. When the user presses the open/close button 13, and the open/close button 13 resists against the inner cover plate 15, the inner cover plate 15 can limit the open/close button 13 from continuing to slide, so that the open/close button 13 will not be separated from the button through hole 111, which can better protect the structure of the battery holder cover plate 10.

Further, a first groove 11a is formed in an inner side wall of the first sliding cover 11. First sliding blocks 112 are arranged on two opposite sides of the first groove 11. A slideway 113 is formed between the first sliding block 112 and the first groove 11a. A first part 121 of the second sliding cover 12 is arranged in the first groove 11a. Second sliding blocks 122 are convexly arranged on two sides of the first part 121 of the second sliding cover 12. The second sliding block 122 is embedded in the slideway 113 and slides in the slideway 113.

It can be understood that a size of the second sliding block 122 matches a size of the slideway 113. The second sliding block 122 is embedded into the slideway 113, slidable connection between the first sliding cover 11 and the second sliding cover 12 can be achieved, so that the structure is stable, and the space is saved.

Further, one end of the first groove 11a is adjacently provided with a first convex block 114 and a second convex block 115. The button through hole 111 is arranged at one end away from the first convex block 114 and the second convex block 115. One end of the elastic sheet 14 is provided with a fourth through hole 142 and a fifth through hole 143. The first convex block 114 is connected to the fourth through hole 142. The fifth through hole 143 sleeves the second convex block 115.

It can be understood that a size of the button through hole 111 matches the size of the open/close button 13. The first convex block 114 and the fourth through hole 142 can be fixedly connected through a limiting member, ensuring that the elastic sheet 14 is firmly connected to the first sliding cover 11 and will not be separated. The second convex block 115 is arranged in the fifth through hole 143, the stability of connection between the elastic sheet 14 and the first sliding cover 11 can be further improved, and the elastic sheet 14 will not move.

Further, a second groove 13a is formed in the open/close button 13. A fourth convex block 131 is arranged in the second groove 13a. The other end of the elastic sheet 14 is provided with a third through hole 141 and is embedded in the second groove 13a. The third through hole 141 sleeves the fourth convex block 131.

It can be understood that a size of the end of the elastic sheet 14 provided with the third through hole 141 matches a size of the second groove 13a, and the end is embedded in the second groove 13a. The third through hole 141 sleeves the fourth convex block 131, so that the connection between the elastic sheet 14 and the open/close button 13 is more stable.

Further, first limiting slots 125 are arranged on two sides of the first part 121 of the second sliding cover 12. A sixth convex block 144 is arranged at one end, close to the third through hole 141, of the elastic sheet 14. The sixth convex block 144 is clamped in the first limiting slots 125 to limit the relative sliding between the first sliding cover 11 and the second sliding cover 12.

It can be understood that the third through hole 141 of the elastic sheet 14 is connected to the open/close button 13. When the open/close button 13 is in the locked position, the sixth convex block 144 is clamped in the first limiting slots 125. In this case, the first sliding cover 11 and the second sliding cover 12 cannot slide relative to each other. The open/close button 13 is pressed until the sixth convex block 144 is separated from the first limiting slots 125. In this case, the first sliding cover 11 and the second sliding cover 12 can slide relative to each other.

Further, the first part 121 of the second sliding cover 12 is further provided with a first through hole 123 and a second through hole 124, and the open/close button 13 is slidably arranged in the first through hole 123. The elastic sheet 14 passes through the second through hole 124 and is connected to the first sliding cover 11.

It can be understood that when the open/close button 13 slides in the first through hole 123, the first through hole 123 plays a limiting role on the open/close button 13, thus limiting a relative sliding range between the first sliding cover 11 and the second sliding cover. Furthermore, the first convex block 114 and the second convex block 115 can be connected to the elastic sheet 14 through the second through hole 124.

Further, third convex blocks 127 are arranged on the first part 121 of the second sliding cover 12 in an opposite manner. The elastic sheet 14 is arranged between the third convex blocks 127. A limiting bulge 145 is arranged between the fourth through hole 142 of the elastic sheet 14 and the third through hole 141. The open/close button 13 is provided with a third limiting slot 133. The first part 121 of the second sliding cover 12 is provided with a second limiting slot 126. The limiting bulge 145 is slidably arranged in the second limiting slot 126 and abuts against the third limiting slot 133.

It can be understood that the oppositely arranged third convex blocks 127 can play a fixing role on the elastic sheet 14. The limiting bulge 145 cooperates with the second limiting slot 126 and the third limiting slot 133, so that the elastic sheet 14 slides more stably.

Further, an edge of the open/close button 13 is provided with a ringlike bulge 134 in a surrounding manner. The ringlike bulge 134 abuts against the first sliding cover 11.

It can be understood that the ringlike bulge 134 plays a limiting role. When the open/close button 13 is in the locked position, the ringlike bulge 134 resists against the first sliding cover 11, so that the open/close button 13 will not continue to slide to be separated from the button through hole 111, which protects the open/close button 13.

Further, a second part 128 of the second sliding cover 12 is cambered and is provided with a connecting hole 129. An opening is arranged at the connecting hole 129.

It can be understood that the battery holder cover plate 10 can be mounted or removed through the opening arranged at the connecting hole 129, which facilitates a user to replace the battery holder cover plate 10. A hand-clasping slot is arranged on an outer side wall of the arc, which can facilitate the user to remove the battery holder cover plate 10.

Further, the clamping convex block 116 is arranged at one end of the arc of the first sliding cover 11. A convex bar is arranged on an outer side wall between the clamping convex block 116 and the button through hole 111.

It can be understood that the clamping convex block 116 is arranged at a tail portion of the end of the arc of the first sliding cover 11. A radian of the arc is the same as a radian of an edge of the other side of the camera 20, which can be more attractive. The convex bar is arranged on one side close to the button through hole 111, which can increase a friction force and facilitate a user to slide the first sliding cover 11.

Further, a camera 20 includes a camera body 21 and the battery holder cover plate 10 as described in the first aspect.

The camera body 21 is provided with a battery holder 23. A battery 22 is fixed in the battery holder 23 through the battery holder cover plate 10. The camera body 21 is provided with a battery holder opening. A rotating shaft 24 and the clamping slot 25 are arranged at two ends of the battery holder opening. The second sliding cover 12 is provided with a connecting hole 129. The connecting hole 129 is connected to the rotating shaft 24 to achieve rotatable connection between the battery holder cover plate 10 and the camera body 21, and to cover the battery holder opening.

It can be understood that the battery holder cover plate 10 is connected to the rotating shaft 24 through the connecting hole 129. When opened, the battery holder cover plate 10 is still connected to the camera 20 and will not fall off. Furthermore, the battery holder cover plate 10 can be separated from the rotating shaft 24, which facilitates replacement by a user and use in multiple scenarios.

One or more implementation modes are provided above in combination with specific contents, and it is not deemed that the specific implementation of the present disclosure is limited to these specifications. Any technical deductions or replacements approximate or similar to the method and structure of the present disclosure or made under the concept of the present disclosure shall fall within the scope of protection of the present disclosure.

What is claimed is:

1. A battery holder cover plate, applied to a camera and configured to be covered at a battery holder of the camera, wherein the battery holder cover plate comprises a first sliding cover, a second sliding cover, an open/close button, an elastic sheet, and an inner cover plate;

a clamping convex block is arranged at one end of the first sliding cover; the clamping convex block is configured to be clamped to a clamping slot in one end of the camera;

one end of the second sliding cover is configured to be rotatably connected to the other end of the camera;

the first sliding cover and the second sliding cover are slidably connected; one end of the elastic sheet is connected to the first sliding cover, and the other end is connected to the open/close button; the open/close button is arranged in a button through hole of the first sliding cover;

the open/close button slides between a released position and a locked position; when the open/close button slides to the locked position, the elastic sheet abuts against the first sliding cover to limit relative sliding between the first sliding cover and the second sliding cover; the clamping convex block is clamped to the clamping slot to prevent the battery holder cover plate from rotating; when the open/close button slides to the released position, the elastic sheet is separated from the first sliding cover to allow the first sliding cover and the second sliding cover to slide relatively; the clamping convex block is separated from the clamping slot to allow the battery holder cover plate to rotate; and the inner cover plate is connected to the second sliding cover, and a size of the inner cover plate matches a size of a battery holder opening of the camera, wherein a first groove is formed in an inner side wall of the first sliding cover; first sliding blocks are arranged on two opposite sides of the first groove; a slideway is formed between the first sliding block and the first groove; a first part of the second sliding cover is arranged in the first groove, and second sliding blocks are convexly arranged on two sides of the first part of the second sliding cover; and the second sliding block is embedded in the slideway and slides in the slideway, wherein one end of the first groove is adjacently provided with a first convex block and a second convex block; the button through hole is arranged at one end away from the first convex block and the second convex block; one end of the elastic sheet is provided with a fourth through hole and a fifth through hole; the first convex block is connected to the fourth through hole; and the fifth through hole sleeves the second convex block, wherein the first part of the second sliding cover is further provided with a first through hole and a second through hole, and the open/close button is slidably arranged in the first through hole; and the elastic sheet passes through the second through hole and is connected to the first sliding cover.

2. The battery holder cover plate according to claim 1, wherein a second groove is formed in the open/close button; a fourth convex block is arranged in the second groove; the other end of the elastic sheet is provided with a third through hole and is embedded in the second groove; and the third through hole sleeves the fourth convex block.

3. The battery holder cover plate according to claim 1, wherein first limiting slots are arranged on two sides of the first part of the second sliding cover; a sixth convex block is arranged at one end, close to the third through hole, of the elastic sheet; and the sixth convex block is clamped in the first limiting slots to limit the relative sliding between the first sliding cover and the second sliding cover.

4. The battery holder cover plate according to claim 1, wherein an edge of the open/close button is provided with a ringlike bulge in a surrounding manner; and the ringlike bulge abuts against the first sliding cover.

5. The battery holder cover plate according to claim 1, wherein a second part of the second sliding cover is cambered and is provided with a connecting hole; an opening is arranged at the connecting hole; the clamping convex block is arranged at one end of the arc of the first sliding cover; and a convex bar is arranged on an outer side wall between the clamping convex block and the button through hole.

6. A battery holder cover plate, applied to a camera and configured to be covered at a battery holder of the camera, wherein the battery holder cover plate comprises a first sliding cover, a second sliding cover, an open/close button, an elastic sheet, and an inner cover plate;

a clamping convex block is arranged at one end of the first sliding cover; the clamping convex block is configured to be clamped to a clamping slot in one end of the camera;

one end of the second sliding cover is configured to be rotatably connected to the other end of the camera;

the first sliding cover and the second sliding cover are slidably connected; one end of the elastic sheet is connected to the first sliding cover, and the other end is connected to the open/close button; the open/close button is arranged in a button through hole of the first sliding cover;

the open/close button slides between a released position and a locked position; when the open/close button slides to the locked position, the elastic sheet abuts against the first sliding cover to limit relative sliding between the first sliding cover and the second sliding cover; the clamping convex block is clamped to the clamping slot to prevent the battery holder cover plate from rotating; when the open/close button slides to the released position, the elastic sheet is separated from the first sliding cover to allow the first sliding cover and the second sliding cover to slide relatively; the clamping convex block is separated from the clamping slot to allow the battery holder cover plate to rotate; and the inner cover plate is connected to the second sliding cover, and a size of the inner cover plate matches a size of a battery holder opening of the camera, wherein a first groove is formed in an inner side wall of the first sliding cover; first sliding blocks are arranged on two opposite sides of the first groove; a slideway is formed between the first sliding block and the first groove; a first part of the second sliding cover is arranged in the first groove, and second sliding blocks are convexly arranged on two sides of the first part of the second sliding cover; and the second sliding block is embedded in the slideway and slides in the slideway, wherein one end of the first groove is adjacently provided with a first convex block and a second convex block; the button through hole is arranged at one end away from the first convex block and the second convex block; one end of the elastic sheet is provided with a fourth through hole and a fifth through hole; the first convex block is connected to the fourth through hole; and the fifth through hole sleeves the second convex block, wherein third convex blocks are arranged on the first part of the second sliding cover in an opposite manner; the elastic sheet is arranged between the third convex blocks; a limiting bulge is arranged between the fourth through hole of the elastic sheet and the third through hole; the open/close button is provided with a third limiting slot; the first part of the second sliding cover is provided with a second limiting slot; and the limiting bulge is slidably arranged in the second limiting slot and abuts against the third limiting slot.

7. A camera, comprising a camera body and a battery holder cover plate, wherein the battery holder cover plate comprises a first sliding cover, a second sliding cover, an open/close button, an elastic sheet, and an inner cover plate;

a clamping convex block is arranged at one end of the first sliding cover; the clamping convex block is configured to be clamped to a clamping slot in one end of the camera;

one end of the second sliding cover is configured to be rotatably connected to the other end of the camera;

the first sliding cover and the second sliding cover are slidably connected; one end of the elastic sheet is connected to the first sliding cover, and the other end is connected to the open/close button; the open/close button is arranged in a button through hole of the first sliding cover;

the open/close button slides between a released position and a locked position; when the open/close button slides to the locked position, the elastic sheet abuts against the first sliding cover to limit relative sliding between the first sliding cover and the second sliding cover; the clamping convex block is clamped to the clamping slot to prevent the battery holder cover plate from rotating; when the open/close button slides to the released position, the elastic sheet is separated from the first sliding cover to allow the first sliding cover and the second sliding cover to slide relatively; the clamping convex block is separated from the clamping slot to allow the battery holder cover plate to rotate; and the inner cover plate is connected to the second sliding cover, and a size of the inner cover plate matches a size of a battery holder opening of the camera, wherein the camera body is provided with a battery holder; a battery is fixed in the battery holder through the battery holder cover plate; the camera body is provided with a battery holder opening; a rotating shaft and the clamping slot are arranged at two ends of the battery holder opening; the second sliding cover is provided with a connecting hole; and the connecting hole is connected to the rotating shaft to achieve rotatable connection between the battery holder cover plate and the camera body, and to cover the battery holder opening, wherein a first groove is formed in an inner side wall of the first sliding cover; first sliding blocks are arranged on two opposite sides of the first groove; a slideway is formed between the first sliding block and the first groove; a first part of the second sliding cover is arranged in the first groove, and second sliding blocks are convexly arranged on two sides of the first part of the second sliding cover; and the second sliding block is embedded in the slideway and slides in the slideway, wherein one end of the first groove is adjacently provided with a first convex block and a second convex block; the button through hole is arranged at one end away from the first convex block and the second convex block; one end of the elastic sheet is provided with a fourth through hole and a fifth through hole; the first convex block is connected to the fourth through hole; and the fifth through hole sleeves the second convex block, wherein the first part of the second sliding cover is further provided with a first through hole and a second through hole, and the open/close button is slidably arranged in the first through hole; and the elastic sheet passes through the second through hole and is connected to the first sliding cover.

8. The camera according to claim 7, wherein a second groove is formed in the open/close button; a fourth convex block is arranged in the second groove; the other end of the elastic sheet is provided with a third through hole and is embedded in the second groove; and the third through hole sleeves the fourth convex block.

9. The camera according to claim 7, wherein first limiting slots are arranged on two sides of the first part of the second sliding cover; a sixth convex block is arranged at one end, close to the third through hole, of the elastic sheet; and the sixth convex block is clamped in the first limiting slots to limit the relative sliding between the first sliding cover and the second sliding cover.

10. The camera according to claim 7, wherein third convex blocks are arranged on the first part of the second sliding cover in an opposite manner; the elastic sheet is arranged between the third convex blocks; a limiting bulge is arranged between the fourth through hole of the elastic sheet and the third through hole; the open/close button is provided with a third limiting slot; the first part of the second sliding cover is provided with a second limiting slot; and the limiting bulge is slidably arranged in the second limiting slot and abuts against the third limiting slot.

11. The camera according to claim 7, wherein an edge of the open/close button is provided with a ringlike bulge in a surrounding manner; and the ringlike bulge abuts against the first sliding cover.

12. The camera according to claim 7, wherein a second part of the second sliding cover is cambered and is provided with a connecting hole; an opening is arranged at the connecting hole; the clamping convex block is arranged at one end of the arc of the first sliding cover; and a convex bar is arranged on an outer side wall between the clamping convex block and the button through hole.

\* \* \* \* \*